United States Patent [19]

Detering

[11] 4,028,609
[45] June 7, 1977

[54] DIGITAL FIRING PULSE GENERATOR WITH PULSE SUPPRESSION

[75] Inventor: Richard L. Detering, Buffalo, N.Y.

[73] Assignee: Westinghouse Electric Corporation, Pittsburgh, Pa.

[22] Filed: Dec. 22, 1975

[21] Appl. No.: 642,809

[52] U.S. Cl. .............................. 321/5; 307/252 N; 307/265

[51] Int. Cl.² ......................................... H02M 7/00

[58] Field of Search ..... 307/252 J, 252 N, 252 UA, 307/264, 265; 321/5, 11, 18

[56] References Cited

UNITED STATES PATENTS

| | | | |
|---|---|---|---|
| 3,371,252 | 2/1968 | James | 307/265 X |
| 3,596,168 | 7/1971 | Hengsberger | 321/11 X |
| 3,646,578 | 2/1972 | Gregory | 307/252 J |
| 3,681,677 | 8/1972 | Badal | 307/252 N X |
| 3,713,011 | 1/1973 | Johnson et al. | 321/5 X |

Primary Examiner—William M. Shoop
Attorney, Agent, or Firm—C. M. Lorin

[57] ABSTRACT

A digital firing pulse generator for thyristor rectifiers in a power converter system uses a time dependent waveform to trigger a one-shot multivibrator for generating a hard pulse of minimum duration and includes a free running oscillator generating a train of picket fence pulses applied to the thyristor rectifier after the hard pulse in order to insure extended conduction. A pulse suppressor actuated upon an emergency prevents the initiation of a hard pulse but does not shorten the duration of any initiated hard pulse, and suppresses the picket fence pulses. Provision for end stops on the picket fence pulses exist and the generation of a separate hard pulse is digitally controlled when a hard pulse is missing after the selection of a rectifier next to be fired.

9 Claims, 4 Drawing Figures

DIGITAL FIRING PULSE GENERATOR WITH PULSE SUPPRESSION

CROSS-REFERENCE TO RELATED APPLICATIONS

The present application is related to the following concurrently filed patent application which is assigned to the same assignee as the present application:

Ser. No. 642,814, which was filed on Dec. 22, 1975 by Frank O. Johnson.

BACKGROUND OF THE INVENTION

It is known in the art of firing pulse generators for static power converters to trigger a one-shot multivibrator at an instant corresponding to a desired fire angle upon selecting with a ring counter the next thyristor rectifier to be fired. The firing control circuit of the appropriate thyristor is selected by a distributor and the generated firing pulse is passed to the firing control circuit of the thyristor as selected by the distributor.

It is also known to generate an "extended" firing pulse lasting for the total conduction period, e.g., up to the point of natural commutation of the thyristor rectifier. See, for instance, Chapter 10 of B. R. Pelly "Thyristor Phase-Controlled Converters and Cycloconverters", published by John Wiley in 1971. Pelly also underlies in this book the importance of the leading edge in the ignition process and also mentions the usefulness of an extended pulse for reliable operation under all circumstances. A technique is mentioned by Pelly consisting in providing a "pseudo-extended" firing pulse (see page 274) formed with a train of shorter pulses instead of a continuous pulse, but Pelly also states that problems are encountered with such technique.

Pelly also describes end-stop control (see page 259) for limiting the excursions of the firing control range in the rectification and in the inversion portions of the conduction period. In Pelly further is to be found (see page 277) the technique of inhibiting the firing pulses by inhibiting the master oscillator generating pseudo-extended pulses instead of the ring distributor circuits.

More generally, Chapter 10 of the book by B. R. Pelly provides a general background against which to distinguish the present invention, and also discloses such prior art as can be used to support the description herein of a typical firing pulse generator to which the present invention is applicable. For the latter reason, Chapter 10 (namely from page 248 to page 277) of Brian R. Pelly, "Thyristor Phase-Controlled Converters and Cycloconverters" published in 1971 by John Wiley is hereby incorporated by reference.

An object of the present invention is to provide a firing pulse generator in which two kinds of pulses are successively applied to each selected thyristor rectifier, one pulse called a "hard pulse" being initiated for actually firing the rectifier, followed by a train of short pulses for refreshing the state of conduction throughout the desired conduction period.

Another object of the present invention is to provide a firing pulse generator for thyristors in which two kinds of pulses are successively applied to each selected thyristor, and in which provision is made for inhibition of either kind of pulses.

SUMMARY OF THE INVENTION

The present invention proposes to apply first an automatically controlled "hard" pulse of minimum duration and firing quality to the oncoming thyristor rectifier, then allowing a series of pulses of shorter duration, hereinafter called "picket fence" pulses, independently generated and allowed to be applied in order to insure a reliable state of conduction throughout the desired conduction period.

The invention also resides in inhibiting the generated picket fence pulses in such a way that the train does not extend beyond a predetermined electric angle. The invention provides also for the inhibition of the hard pulse, but is done without shortening to any extent the duration of a hard pulse already initiated. This feature is required in order not to damage the thyristors whenever, under an emergency, an immediate interruption of the converter system has become necessary.

To this effect, the firing pulse generator according to the present invention includes a time dependent waveform generator and a comparator operating in relation to a reference signal for establishing a firing angle to control the generation of a hard pulse, and a free running oscillator generating a picket fence train, both types of pulses being gated by a distributor triggered by the hard pulse upon each firing instant to pass both types of pulses to the firing control circuit of the oncoming thyristor.

The firing pulse generator according to the present invention also features a simple mode of digitally selecting the end stops.

Suppression of the two types of firing pulses is simply provided by preventing any triggering of a hard pulse. Such suppression is also achieved without impeding the generation of a hard pulse once initiated, while suppressing, nevertheless, the application of the picket pulse train.

Provision is also made for separately generating a hard pulse followed by picket fence pulses whenever the reference signal fails to properly intersect the time dependent waveform fed to the comparator, since a hard pulse would not be generated when all other factors make the occurrence necessary.

PREFERRED EMBODIMENT OF THE INVENTION

Figure 1:
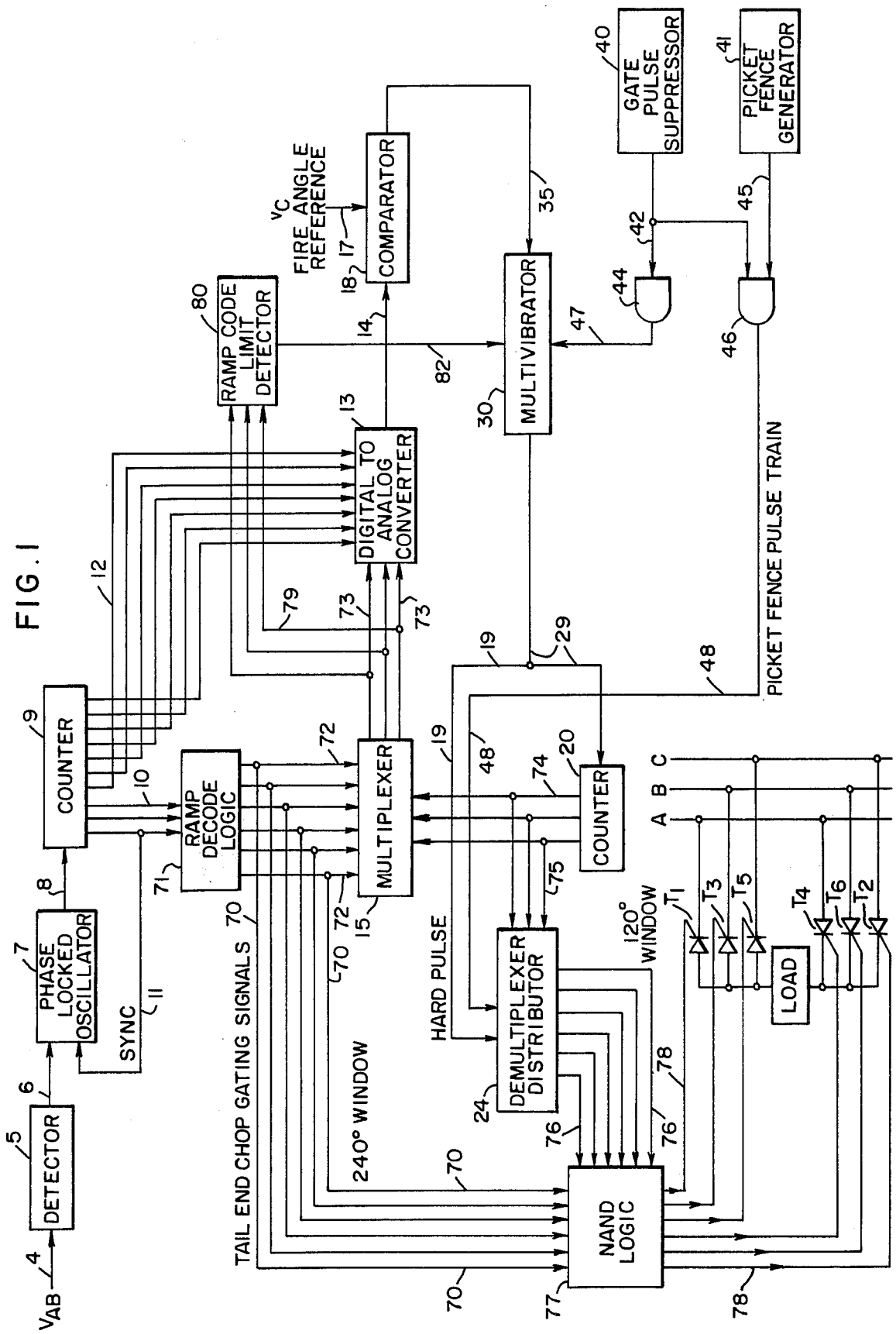
FIG. 1 is a diagrammatic representation of the digital firing pulse generator according to the present invention.

FIG. 1 shows six power thyristors $T_1$–$T_6$ mounted in a bridge with a load across a balanced three-phase system supplying voltages $V_A$, $V_B$, $V_C$ on three busses $L_1$, $L_2$, $L_3$ for phases A, B and C. The thyristors are gated for conduction from separate lines 78. The firing circuit according to the present invention includes a zero-crossing detector 5 supplied on line 4 with a reference wave $A_{AB}$ from the three-phase power system. Each time the reference waveform passes by zero in one direction, the output of zero-crossing detector 5 inhibits a logic transition. A phase locked oscillator in the form of a voltage controlled oscillator 7 generates a clock signal on line 8 having a frequency determined by the relation between two input signals fed on respective lines 6 and 11. The clock signal on line 8 is fed into a digital counter 9 thereby to generate in digital form on lines 10, a digital representation of the number of clock pulses received since the last detected passing by zero of the reference waveform. N pulses are thus generated which instantaneously represent the electrical angle of waveform $V_{AB}$ whenever the most significant digit, on line 11, is in phase with the reference signal on line 4. This technique is generally known and is described in the above-mentioned copending application by F. O. Johnson. A digital to analog converter 13 responsive to such digital representation from counter 9 generates a ramp signal on line 14 which is an analog representation of the electrical angle of the reference wave $V_{AB}$ on line 4. A comparator 18 responsive to the ramp signal on line 14 and to a reference voltage $V_C$ on line 17 generates at its output on line 35 a critical signal which represents in time the firing angle defined by the reference voltage $V_C$. Such critical signal on line 35 triggers a multivibrator 30 which in turn sets via line 29 a counter 20 into one of successive pre-established digital states. The latter over lines 74, 75 controls the logic of a distributor demultiplexer circuit 24, to select one of a plurality of thyristor channels among lines 76 and to which the control signal on lines 29 and 19 is gated.

Since the object is to fire each of thyristors $T_1$–$T_6$ in sequence, counter 9 and D/A converter 13 are so controlled that on line 14 several ramps shifted relative to each other are generated in succession. Each corresponds to a phase of the power supply for a given polarity. The phase shift is achieved by a multiplexer 15 having input lines 74 derived from counter 20 and logically set so as to modify the most significant digits on line 10 from counter 9 thereby to derive on output lines 73 an altered digital combination of the most significant digits which is applied to D/A converter 13 together with the digits or lesser significance directly received from lines 12. This technique is shown in the aforementioned application of F. O. Johnson.

Figure 2:
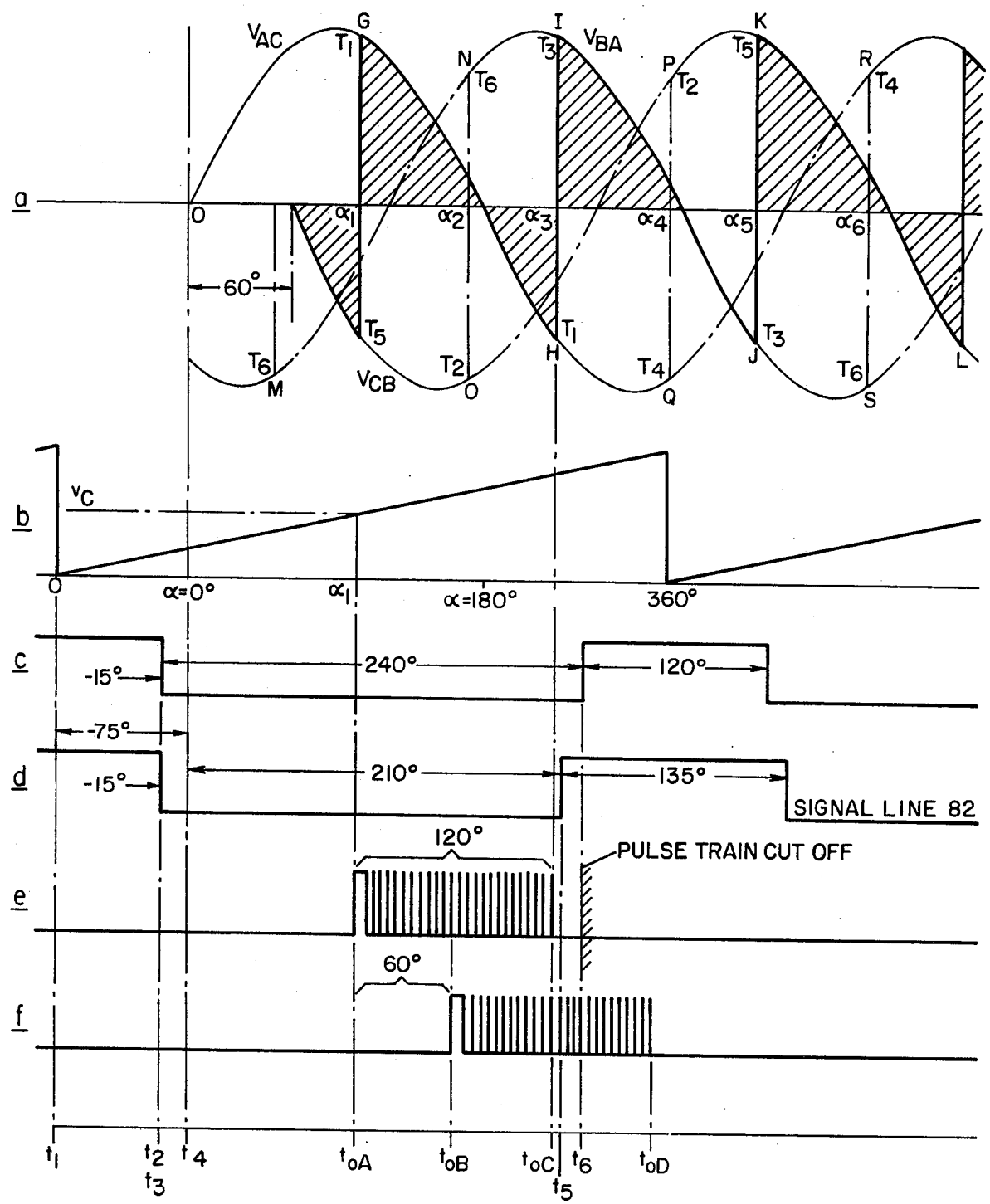
FIG. 2 illustrates with curves the firing cycles of the thyristor arrangement of FIG. 1.

Referring to FIG. 2, curves (a) are the line voltage waveforms $V_{AC}$, $V_{CB}$ and $V_{BA}$ as applied to the thyristors $T_1$–$T_6$. They are shown with the periods of conduction indicated at firing angles $\alpha_1$–$\alpha_6$ for the respective thyristors. These curves are at a 60° phase shift to one another. Curve (b) shows one of the ramps generated by digital to analog converter 13 on line 14. The particular ramp is the one for thyristor $T_1$ which is fired at firing angle $\alpha_1$ for a voltage reference $V_C$ on line 17 at the input of comparator 18. In the commutation portion of the conduction cycle of thyristor $T_5$ a time $t_{oA}$ when thyristor $T_1$ fires, the voltage $V_{AC}$ applied between phases A and C causes natural commutation to occur turning OFF thyristor $T_5$. The same commutation process occurs at each firing angle $\alpha_2$–$\alpha_6$, in this order and alternatively for each polarity on the thyristor bridge.

The generation of a critical signal on line 35 depends upon the intersection of the horizontal line $v_c$ with the ramp. Should the voltage $V_C$ be smaller than the lowest point on the ramp or larger than the highest point on the ramp, comparator 18 will not generate a critical signal on line 35 to trigger multivibrator 30. Thus, no hard pulse will be generated. In order to insure the occurrence of a hard pulse at all times it is generally known to establish two end stops which define an operative range along the ramp. These end stops are generally obtained by imposing a minimum bias on the reference voltage $V_C$ and an upper limit thereto, so that as seen by comparator 18 no excursion of $V_C$ outside these two limits is possible. The lower limit is generally known as the "rectification end stop", the other is the "inversion end stop". They are shown in FIG. 2 at $ES_1$ and $ES_2$ on the ramp and occur at times $t_3$ and $t_5$, respectively. Typically 210° is established between the two end stops.

The ramp extends a 360° electrical angle and is shifted to the left of the associated line voltage waveforms, typically by 75° (from time $t_1$ to time $t_4$ on FIG. 2).

Special consideration should now be given to the hard pulses and picket fence pulses provided by the circuit of FIG. 1.

As earlier mentioned, it is known from Pelly to control the conduction period of a thyristor by applying a continuous extended pulse. Since the firing circuit of a thyristor generally includes a power circuit and a transformer for building and applying an effective gating pulse on the thyristor, an extended pulse is not easily handled by such firing circuit. In particular, the use of a transformer raises a problem of bandwidth. A transformer of narow bandwidth is less costly, thus more desirable. Pelly also states that the front edge of the extended pulse is actually the effective portion for igniting a thyristor. Therefore it is suggested to use a pseudo-extended pulse consisting of a discrete succession of narrow pulses, rather than a continuous pulse.

However, such pseudo-extended pulse is used in the prior art as a substitute for an extended pulse and as such, it is initiated and generated for the full conduction angle, like a continuous pulse. In contrast, the present invention rests upon the consideration that the two functions of igniting a thyristor and refreshing a thyristor already in conduction are more advantageously treated separately within a digital pulse generator, so as to optimize each function and reduce the overall cost of the system. To this effect, a hard pulse is generated for actually firing the thyristor and a picket fence pulse train is supplied to the thyristor behind the hard pulse. The hard pulse is a pulse having the minimum quality necessary for an efficient firing of the particular type of thyristor under control. For instance, the one-shot multivibrator 30 of FIG. 1 may be a solid state device sold in the open market as Model MC14528 of Motorola, Inc. Such device when triggered generates on line 29 a digital pulse of 15 volts. According to the present invention, such digital information is passed via line 19 and demultiplexer distributor 24 onto the selected one of channels 76, and from there through NAND logic gate 77 onto one of channels 78. With each thyristor $T_1$–$T_6$ is associated a firing control circuit (not shown) which includes an amplification stage to satisfactorily gate the thyristors. In this fashion on the gate electrode of the thyristor is applied, for each firing of the one-shot multivibrator 30, an effective hard pulse of proper quality in terms of duration and intensity. Typically, such hard pulse, according to the present invention is a 50 microsecond igniting pulse. Thus, the hard pulse is a pulse of higher level and power with a sufficiently long duration so as to insure the most efficient gating condition for the particular type of thyristor to be ignited.

In addition to the hard pulse, the digital pulse generator according to the present invention, supplies a train of picket fence pulses, namely a series of equally spaced pulses of shorter duration for the purpose of refreshing the conduction of the thyristor which has just been ignited. Frequently, depending upon the conditions of application, a thyristor may receive a reversed biasing voltage which could turn it back from the ON to the OFF state. The oncoming picket fence pulse will turn it ON again. More generally the picket fence pulses assure a reliable period of conduction after ignition by a hard pulse. Typically a picket fence pulse lasts 20 microseconds in the case of the preferred embodiment of the invention. Such a picket fence pulse would not be sufficient to safely ignite a thyristor. Also, in contrast with the prior art, the picket fence pulses supplied in the digital pulse generator according to the invention are not synchronized with the line frequency, or with the gating angle releasing a hard pulse. The master oscillator is freely running. Therefore, actually the picket fence pulses are not gated in time. They are simply allowed to pass into a channel together with the hard pulse from the time the latter is being applied.

The digital pulse generator of FIGS. 1 and 3 in addition provides for pulse suppression upon an emergency. Normally, the operation of a firing pulse generator is terminated in two steps. The firing angle of the thyristor is phased back to the point of zero power and thereafter either the power to the thyristor is cut off, or the load is switched off. Instead of such a controlled shut-down, there are situations requiring an immediate interruption of operation. For instance the emergency may be an overcurrent in the system due to a short circuit, or the thyristors fail to commutate properly. The equipment, the load or the thyristors could be damaged if the converter operation would be allowed to proceed. Therefore, sensing devices (not shown) are provided such as electronic limit switches, current transformer and an electronic detector or comparator device which are able to actuate a pulse suppressor (GPS) such as shown at 40 in FIG. 1. When suppressor 40 is actuated upon in response to such emergency situation, an inhibit signal 42 is generated at the output on line 42. A NAND gate 44 passes such inhibit signal on line 47 to a control electrode of multivibrator 30 so as to prevent triggering from line 35. In this fashion no hard pulse can be applied onto counter 20 whenever an inhibit signal is present on line 47. This particular feature also preserves the integrity of a hard pulse which has already been initiated by the multivibrator, since the latter will remain in its second state for the full 50 $\mu s$ duration. As a matter of fact, an optimized hard pulse has been developed for application to the thyristor, and it is not desired to apply less than such full hard pulse in order to avoid any deterioration of the thyristors as could occur as a result of an incomplete ignition.

While the picket fence pulses are being generated from a free running picket fence generator 41 and passed via line 45 and NAND gate 46 on line 48 to the demultiplexer distributor 24, the pulse suppressor 40, when actuated, applies an inhibit signal on lines 42' to block NAND gate 46 so that the pulses are no longer passed to the thyristors $T_1-T_6$.

FIG. 1 shows that the picket fence pulses issued from generator 41 do not partake to the triggering actions of the hard pulses on line 29 which advance counter 20. The picket fence pulses are passed on line 48 in parallel to the hard pulse appearing on line 19 to the demultiplexer distributor 24. The logic of the distributor is such that one of channels 76 becomes available to receive the hard pulse from line 19 at the moment counter 20 transfers to a subsequent state. This logic is defined by lines 74, 75 from counter 20. The selected channel remains available during the conduction angle which, in this particular instance, has been chosen to be of 120°. Therefore, the picket fence pulses are admitted on the selected channel from line 48 together with the hard pulse from line 19. They however extend for the entire conduction period, as shown in FIG. 2.

Some precautions are necessary in order that the pseudo-extended pulse created by the combination of hard pulse and picket fence pulses does not extend too far into the region for which the thyristor becomes reverse biased, as the case would be if the firing angle were shifted back too much. If this happened, the thyristor could exhibit current dissipation due to internal leakage and the thyristor could be damaged. Also, the thyristor bridge could fail to properly operate. In order to prevent this, it is known to cut-off the extended pulse at the point a reverse bias condition would occur. By sensing the commutating voltage on the thyristor it has been possible in the past to generate a control signal causing an immediate cut-off to the conduction at this point. In contrast, with the digital pulse generator according to the present invention, a window is established beyond which the picket fence pulses are not allowed to pass to the thyristor firing circuit. This feature appears in FIG. 1 with the NAND logic circuit 77 inserted after demultiplexer 24 between channels 76 and 78. The idea is to generate digital information representing the instantaneous electrical angle in relation to the particular phase under conduction and to compare such instantaneous information with a digital number representing the cut-off point known from the firing angle for a given conduction angle. From such comparison a critical signal is derived and applied to gate circuit 77. In this manner, it is possible to generate an inhibit signal to prevent the picket fence pulses from passing through gate 77 at the exact time $t_6$ shown in FIG. 2. Lines 73 at the output of multiplexer 15 would provide the required digital information since the three most significant digits characterize the particular ramp and phase line as selected by counter 20 after transfer. A counter would provide the digital reference for establishing a count at time $t_6$ corresponding to the cut-off point. Instead of this solution, FIG. 1 shows as a matter of further illustration, a different implementation by taking advantage of the simplification due to the fact that all phases are 60° apart and the desired cut-off point can be conveniently and particularly chosen to be on one side of a window of 240°, as shown in FIG. 2. In such case, it is possible to use the reference timing waveform tied to line voltage $V_{AB}$ for all the thyristors. A division of such time reference into six different time intervals and a proper distribution of these time intervals between the respective phases, or channels, makes it possible to establish the cut-off points for the various thyristors. To this effect, a ramp decode logic circuit 71 is provided for generating from counter 9 a decoded representation of the three most significant digits thereof. Thus, six wires 70 are derived as logic wires to NAND logic circuit 77 which establish for each channel 76 alternate ON and OFF states such as those shown by curve (c) of FIG. 2. Actually the front edge of curve (c) is not used since end-stop $ES_1$ (at time $t_2$ and −15°) would not allow the firing angle to decrease beyond −15°, or time $t_2$. In general $t_3$ must always be greater or equal to $t_2$; in this particular instance $t_3$ has been made equal to $t_2$. However, should the firing angle be shifted back toward end-stop $ES_2$, a moment will arrive when the picket fence pulses, which are separately fed, will become cut-off more and more (as can be seen from a comparison of curves (e) and (f) of FIG. 2). Time $t_6$, at 225° is the cut-off point in this particular instance.

How a conduction angle of 120°, such as shown by curves (e) and (f) of FIG. 2, is implemented will appear from the description hereinafter given by reference to FIG. 3.

End-stops $ES_1$ and $ES_2$ of FIG. 2, are generally established by generating on line 17 (FIG. 1) limit analog voltages such that $V_c$ actually never appears outside these two limits. In the case of FIG. 1, this analog mode is not used to establish end-stops $ES_1$ and $ES_2$. If $v_c$ is allowed, as seen from the comparator 18, to decrease to such extent that, at the beginning or the top of the ramp (FIG. 2), a comparison can no longer be made by comparator 18, no critical signal will be generated on line 35 and no hard pulse will be applied on line 29 to advance counter 20. In order to prevent this and insure the ignition of the thyristor next in sequence, a hard pulse is caused to appear by controlling multivibrator 30 separately. As shown in FIG. 1, a digital information is derived from lines 73 at the output of multiplexer 15 and applied via lines 79 to ramp code limit detector circuit 80. The latter circuit is in the form of a digital decoder which detects the desired end-stops $ES_1$, $ES_2$ in the form of a transition to a digital state. Normally the decoder 80 detects these two limits and assumes opposite states at the output 82 for counts within and outside these limits. The signal on line 82 is applied as a triggering signal to multivibrator 30. A hard pulse is thus, generated on line 29 and normal operation will result as if a firing angle had been established at this time.

It is observed that while two kinds of pulses are generated and applied to the firing control circuits of the thyristors, gate pulse suppression operates on both types of pulses while the picket fence generator remains free-running and the hard pulse remains unaffected if the multivibrator has already been triggered. These two features are necessary for two important considerations.

First, it is convenient to have a free-running oscillator for the generation of the picket fence pulses. Since the hard pulse is initiated each time one particular rectifier is to be turned on (for instance, at the time $t_{oB}$ when the oncoming rectifier $T_2$ is fired and the outgoing rectifier $T_1$ goes out of conduction, as shown in FIG. 2) thus, at the instant when counter 20 assumes its next state, all what is needed is to supply the available picket fence train to the appropriate channel concomitantly and after such transfer. It is also necessary to have the picket fence supplied to several channels in parallel since more than one rectifier are conducting at the same time (for instance at $t_{oc}$ when rectifier $T_2$ is fired following firing of rectifier $T_1$). The independence of generator 41 makes the picket fence train available at all times without any particular triggering circuitry.

Secondly, once a hard pulse appears on line 19 the firing control circuit associated with the selected thyristor initiates the ignition process which will be safely completed at the end of the 50 μs period, since the hard pulse has been specifically designed for this purpose. It is important not to interrupt a hard pulse once it has been applied. Once initiated, the ignition process must proceed for the entire duration of the hard pulse.

Figure 3A:
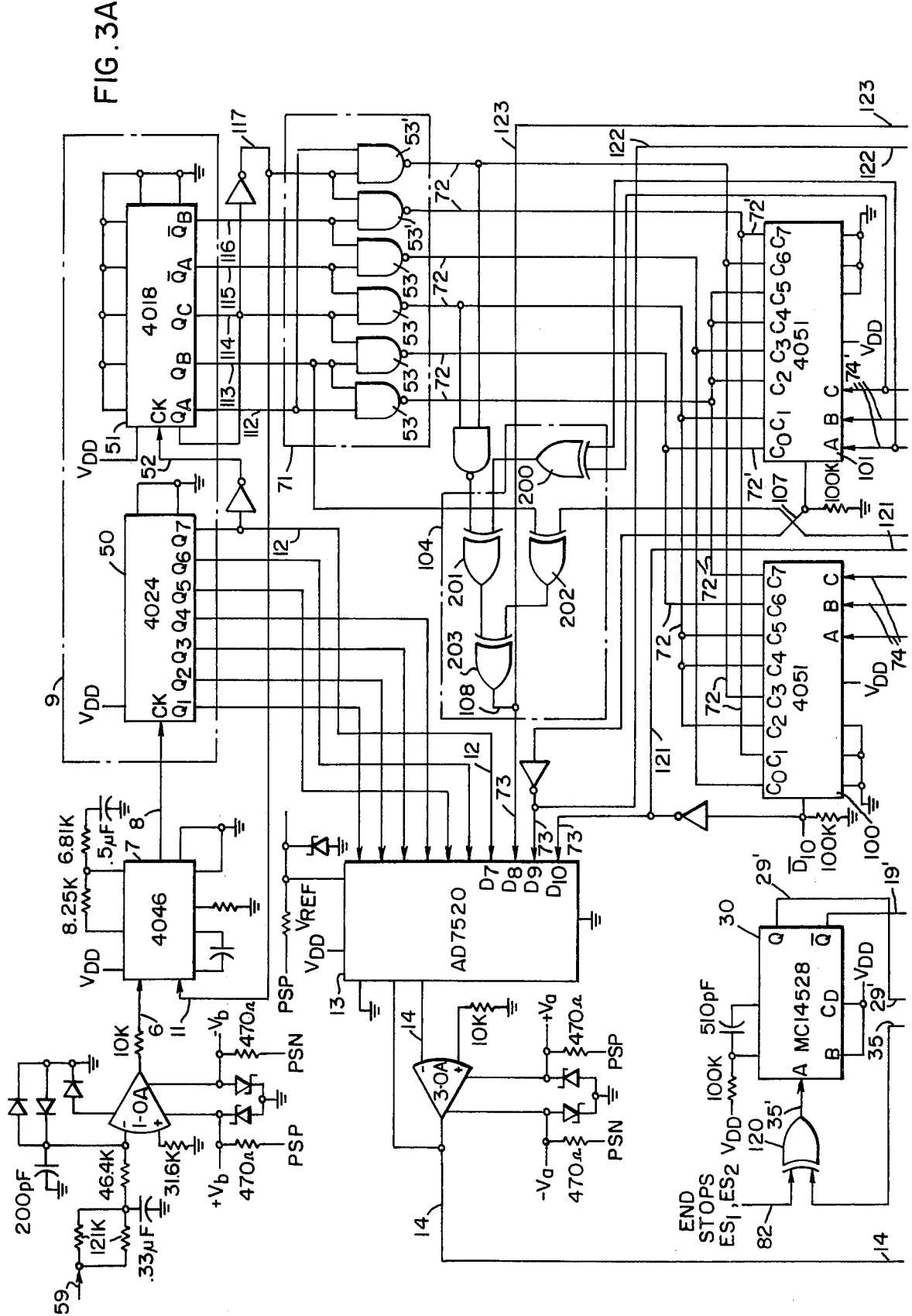
FIGS. 3A and 3B are a schematic representation of the preferred embodiment of the present invention, including a digital circuit which can be used to generate an auxiliary hard pulse whenever a hard pulse has been missed.
Figure 3B:
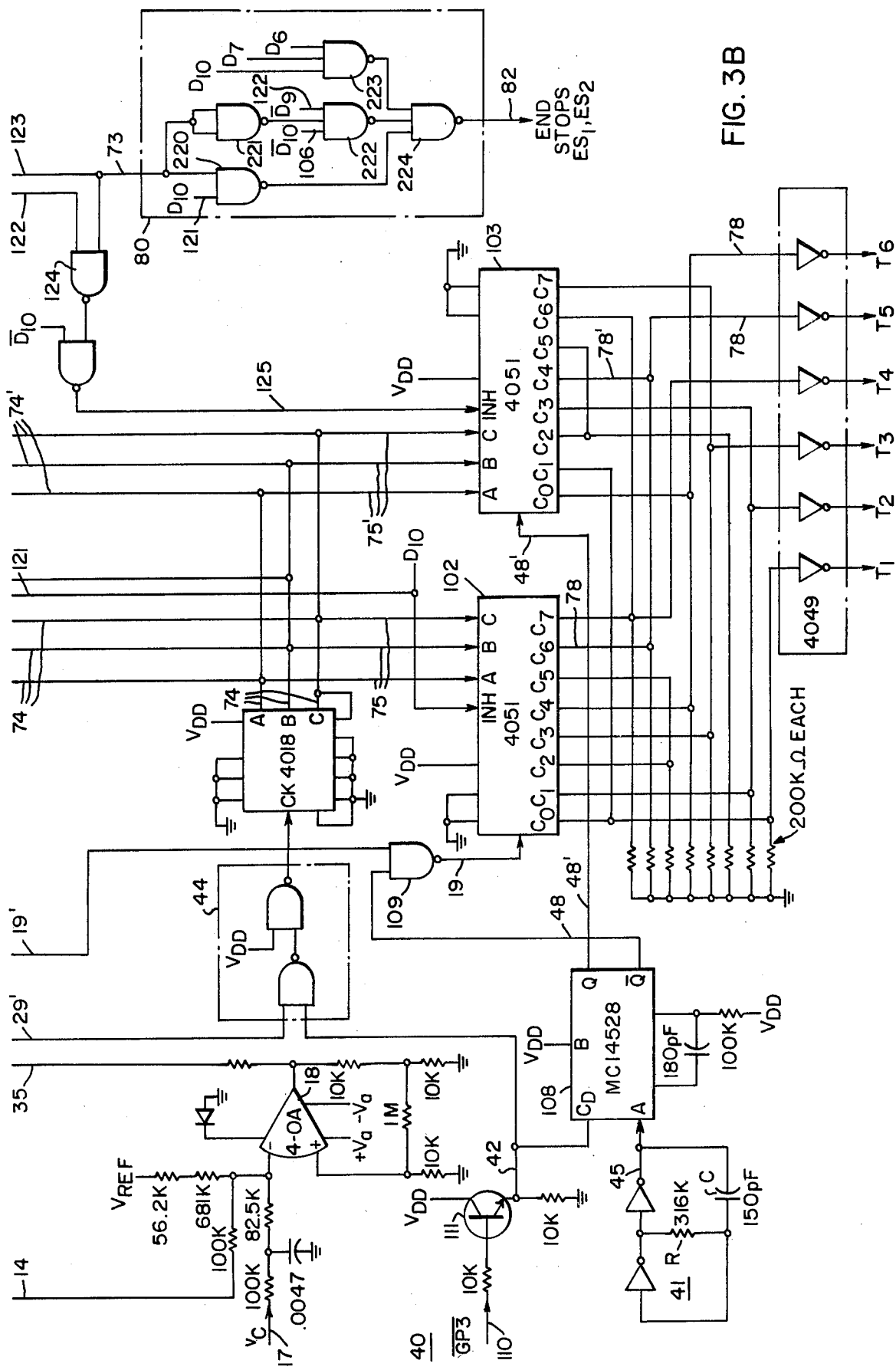

Referring to FIGS. 3A and 3B, the preferred embodiment of the invention is illustrated in the form of a printed circuit board having solid state components which can be used to implement the block diagram of FIG. 1.

Operational amplifier 1-OA is used as a comparator to detect the occurrence of a zero crossing. Thus at 59 is applied an input signal representing the reference line voltage $V_{AB}$. Operational amplifier 1-OA generates on output line 6 a signal which is synchronized with the occurrence of a zero crossing. This is the signal applied to phase detector 5 of FIG. 1. A solid state device 127 is used combining detector 5 and voltage controlled oscillator 7. In this instance, the solid state device used, is known on the open market as Model CD4046 manufactured by RCA Corporation.

The output of device 127 is fed into the clock input of a seven-bit counter 50 which is itself triggering, via line 52, a three-bit counter 51. The seven outputs $Q_1$–$Q_7$ of counter 50 represent the least significant digits of counter 9 of FIG. 1. These are applied via lines 12 to the analog to digital converter 13. Counter 51 provides on lines 112, 113, 114 three digital outputs $Q_A$, $Q_B$, $Q_C$, and on lines 115, 116 outputs $\overline{Q}_A$, $\overline{Q}_B$. Output $\overline{Q}_C$ is obtained as shown on line 117 from line 114. A proper combination of these outputs is obtained by wiring logic therebetween and by NAND devices 53 and 53'. This combination yields on line 72 the binary equivalents $Q_8$, $Q_9$ and $Q_{10}$ of outputs $Q_A$, $Q_B$, $Q_C$. These correspond to the values on lines 10 and 70 of FIG. 1. The particular arrangement of NAND devices 53, 53' in FIG. 3A is functionally equivalent to ramp decode logic 71 of FIG. 1.

It is observed that on line 11 a signal is desired as a feedback from the most significant digit of device 51 to detect any phase error with the zero crossing synchronized signal on line 6. The components at the entry of operational amplifier 1-OA and those in the feedback loop are so arranged that a delay is introduced of such value as to establish a phase shift of 75° between the actual reference line voltage waveform and the associated ramp as shown in FIG. 2. Indeed all ramps are so shifted relative to the corresponding line voltage waveform.

The multiplexer 15 includes two identical solid state devices 100 and 101 which in this instance are of the type CD4051 manufactured by RCA Corporation, and three exclusive OR devices 200–203 (forming together a functional unit 104). From pin 3 of devices 100 and 101 are respectively derived (on lines 106, 107) the most significant digits $\overline{D}_{10}$ and $\overline{D}_9$ to the digital to analog converter 13. Digit $D_8$ is obtained on line 108 at the output of functional unit 104 as shown on FIG. 3. The lesser significant digits computed to A/D converter 13 are derived directly from counter 50. From ramp decode logic device 71 are derived, on lines 72, as many pairs of input lines 72, 72' to the respective devices 100 and 101. The demultiplexer 24 similarly comprises two solid state devices 102 and 103.

Counter 20 is comprised of one solid state device of the type CD4018, manufactured by RCA Corporation.

Comparator 18 consists of an operational amplifier 4-OA which is responsive to the output on line 14 from an operational amplifier 3-OA associated with the output of the digital to analog converter 13. The latter typically is a 10 bit D/A converter, generally known as model AD7520 manufactured by Analog Devices Inc. When the ramp signal on line matches the level of voltage $V_c$ on line 17, operational amplifier 18 generates a critical signal on line 35 which is fed to a one-shot multivibrator 30. The latter typically is a solid state device of the model MC14528 of Motorola, Inc. Two signals Q and $\overline{Q}$ are derived at the output of device 30. Three signals appear on lines 29 and 29', respectively representing the hard pulse in its direct and inverse form.

The hard pulse on line 29 is received as a clock signal by a solid state device of the type CD4018 manufactured by RCA Corporation. This device is a binary counter 20 serving as a ring counter for the overall system. At the outputs 74 of counter 20 three bits are generated representing upon each reception of a hard pulse one of six successive predetermined states. Outputs 74 are divided into pairs of input lines 74, 74' to solid state devices 100, 101 of multiplexer 15, and 75, 75' to solid state devices 102, 103 of demultiplexer 24.

FIG. 3 also shows a free-running generator 41 having a time constant defined by a resistor R and a capacitor C used to generate on line 45 a train of pulses. These are converted by a monostable multivibrator 108 (which is a solid state device of the same type as device 30) into digital outputs Q and $\overline{Q}$ which are fed on lines 48, 48' to devices 102, 103 respectively. A NAND gate device 109 is receiving the Q signals on line 48, as the picket fence train, and the Q signal on line 19' as the hard pulse signal. They both are passed on line 19, which in this instance corresponds also to line 48 of FIG. 1. The two kinds of pulses are passed on by solid state device 102 to one of the selected outputs $C_0$–$C_7$ thereof which are connected via lines 78 to the rectifiers $T_1$–$T_6$. When actuated by its address pin, device 102 passes the two kinds of pulses to a subsequent channel in response to each oncoming hard pulse on line 19. The picket fence pulses are spread throughout the time 60° until rectifier $T_3$ is ignited, see FIG. 2). It can be seen that with such arrangement a conduction angle of twice 60° is maintained for each thyristor, in a very simple and inexpensive way on lines 78, 78' to any of thyristors $T_1$–$T_6$.

Instead of using the wiring logic of FIG. 1 with line 70 and NAND logic circuitry 77 for gating firing pulses to the thyristors within a window of 240° according to curve (c) of FIG. 2 (time $t_2$–$t_6$), the preferred embodiment shown in FIG. 3 uses an input INH in devices 102, 103 of the demultiplexer 24. From lines 127 and 123 the values $D_9$ and $D_8$ are supplied to a NAND device 124 with an inversion and the output is combined with the value $\overline{D}_{10}$ after inversion to analog on line 125 the INH input to device 103 (on pin 6 of the device). The value $D_{10}$ is directly supplied from line 121 to the INH input of device 102 (on pin 6 of the device).

The preferred embodiment also generates by digital means the window defined by end-stops $ES_1$, $ES_2$ (curve (d) and time $t_3$–$t_5$) of FIG. 2. To this effect digital information is derived for ramp code limit detector 80 from line 123 and digits $\overline{D}_{10}$, $\overline{D}_9$, $D_{10}$, $D_7$, $D_6$ from the input to D/A converter 13 so as to define 60° from the beginning of the ramp and 75° from the end of the ramp. The logical output defined by NAND devices 220–224 of logic circuit 80 is applied via line 82 to an exclusive-OR device 120 which also receives the output on line 35 from comparator 18. The gated signal on line 35' is used to trigger multivibrator 30. It is evident that whenever on line 35 is appears that voltage $v_c$ on line 17 does not intersect the ramp as seen from line 14 to comparator 18, the digital state on line 82 will cause exclusive-OR device 120 to generate a resting interval defined between two successive hard pulses. Thus, the passing of a hard pulse followed by picket fence pulses on a selected line 78 and this lasts 60°, e.g. the phase shift existing between two successive ramp signals selected by lines 74 from counter 20.

At the same time, the picket fence pulse signals are being continuously generated on line 48' onto the second solid state device 103. Therefore, after the transfer of the signals from one of lines 78 to the next, picket fence pulses are still being passed from the parallel path 78' on the same channel (for instance, to thyristor $T_2$, for another edge on line 35' to trigger multivibrator 30.

Gate pulse suppression is initiated by triggering on line 110 the base of transistor 111. As a result an inhibit signal is generated on line 42 from the emitter thereof. This inhibit signal on the one hand blocks NAND gate 44 to prevent passing the hard pulse on line 29' and, on the other hand, blocks solid state device 108 (equivalent by its inhibiting function to NAND gate device 46 of FIG. 1) so as to prevent outputs Q, $\overline{Q}$ thereof from transmitting picket fence signals to solid state devices 102 and 103.

Although the term "thyristor" has been used herein to refer to devices $T_1$–$T_6$, it is understood that any equivalent device that can be used in static power converters, broadly defined as a conduction-controlled switching device having a gate electrode is applicable as well.

I claim:

1. Firing pulse generator for igniting sequentially a plurality of thyristors connected across a polyphase power supply, comprising:
   timing means for establishing a firing angle by reference to a phase of said power supply;
   first means responsive to said firing means for generating a hard pulse of minimum duration to set a selected one of said thyristors into conduction;
   second means for freely generating a series of picket fence pulses of short duration relative to said hard pulse; and
   means operative sequentially in relation to said thyristors and responsive to said hard pulse for applying said hard pulse and said picket fence pulses thereafter to said selected thyristor, thereby to establish a period of conduction therefor.

2. The pulse generator of claim 1 comprising means for generating an inhibit signal in response to the occurrence of an event requiring immediate interruption of the operation of said rectifiers, and
   means responsive to said inhibit signal and before the occurrence of said hard pulse for preventing the generation of said hard pulse, with said sequentially operative means being responsive to said inhibit signal to prevent the application of said picket fence pulses to said selected thyristor.

3. A firing pulse generator for controlling the conduction of a plurality of thyristors arranged across the phase lines of an alternating current polyphase power supply, comprising:
   means for establishing a firing instant in relation to a predetermined firing angle;
   means responsive at said firing instant to said establishing means for generating a hard pulse effective to set into conduction said thyristors;
   counter means responsive to said hard pulse for selecting one of said thyristors as a reset thyristor to be fired;

gating means responsive to said counter means for passing said hard pulse to the selected next thyristor;

means for generating a train of picket fence pulses each effective to refresh the conduction of a fired thyristor;

said gating means being gated by said counter means to pass said picket fence train, concurrently and subsequently to said hard pulse, to the next thyristor during conduction thereof; and said establishing means being operatively conditioned by said counter means to establish a firing angle for a predetermined subsequent one of said thyristors in relation to a preceding such generation of a hard pulse.

4. The generator of claim 3 further including means for establishing a first window permitting passing of said hard pulse and said picket fence train from said gating means.

5. The generator of claim 4 with means for establishing an inversion end stop and a rectifier end stop within said first window.

6. The generator of claim 5 with means for establishing a conduction angle from said fixing instant.

7. The generator of claim 3 with means for responsive to an external event for suppressing said hard and picket fence pulses.

8. The generator of claim 7 with said suppressing means including means for generating an inhibit signal, said hard pulse generating means and said picket fence pulse generating means being separately controlled by said inhibit signal.

9. The generator of claim 8 with said means for generating a hard pulse including a monostable multivibrator operative between a stable and an unstable state, said unstable state having a predetermined duration, said inhibit signal being operative to prevent transfer from said stable state to said unstable state.

* * * * *